(12) United States Patent
Foster et al.

(10) Patent No.: US 8,943,561 B2
(45) Date of Patent: Jan. 27, 2015

(54) TEXT MESSAGE AUTHENTICATION SYSTEM

(75) Inventors: Robert Foster, San Juan Capistrano, CA (US); Scott Goldman, San Juan Capistrano, CA (US); Mark Nielsen, San Juan Capistrano, CA (US)

(73) Assignee: TextPower, Inc., San Juan Capistrano, CA (US)

( * ) Notice: Subject to any disclaimer, the term of this patent is extended or adjusted under 35 U.S.C. 154(b) by 69 days.

(21) Appl. No.: 13/548,640

(22) Filed: Jul. 13, 2012

(65) Prior Publication Data

US 2013/0045713 A1 Feb. 21, 2013

Related U.S. Application Data

(60) Provisional application No. 61/524,676, filed on Aug. 17, 2011.

(51) Int. Cl.
*H04L 29/06* (2006.01)
*H04W 12/06* (2009.01)

(52) U.S. Cl.
CPC ........... *H04W 12/06* (2013.01); *H04L 63/0838* (2013.01); *H04L 63/18* (2013.01)
USPC ................ 726/5; 726/6; 726/7; 726/8; 726/9; 713/168; 713/169; 713/170; 713/171; 713/172

(58) Field of Classification Search
USPC ............................................................ 726/5
See application file for complete search history.

(56) References Cited

U.S. PATENT DOCUMENTS

| | | | |
|---|---|---|---|
| 6,880,079 B2 * | 4/2005 | Kefford et al. | 713/155 |
| 8,151,344 B1 * | 4/2012 | Channakeshava | 726/19 |
| 8,219,542 B2 * | 7/2012 | Niejadlik | 707/709 |
| 2006/0156016 A1 * | 7/2006 | Tanaka | 713/182 |
| 2009/0235339 A1 | 9/2009 | Mennes et al. | |
| 2011/0320354 A1 * | 12/2011 | Coon | 705/44 |

* cited by examiner

*Primary Examiner* — Longbit Chai
(74) *Attorney, Agent, or Firm* — Fish & Tsang LLP

(57) ABSTRACT

Systems and method for authenticating users are presented. A system can send a passkey to a user interface of a known device. A user can then send a messaging service message with the passkey from a second device to the system. After receiving the message from the user, the system can extract the passkey from the message, and compare the received passkey against the passkey originally sent to the user. The known device and the second device can each have separate and unique device identifiers.

26 Claims, 1 Drawing Sheet

TEXT MESSAGE AUTHENTICATION SYSTEM

This application claims the benefit of priority to U.S. provisional application having Ser. No. 61/524,676 filed on Aug. 17, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is text message authentication systems.

BACKGROUND

Improving the security of online and other remote transactions is very important to limit access to authorized personnel, for example when accessing high-security documents or when purchasing an item with a business or personal account. Both parties in any such transaction need to be certain that only authorized personnel can participate in such a transaction to prevent identity theft or improper actions. While it is known to use a username/password to authenticate a remote user, passwords can be inferred or stolen from authorized personnel and used to subsume the identity of an authorized personnel.

U.S. Pat. No. 6,880,079 to Kefford discusses a method for sending a message to a trusted recipient by sending an encrypted reply to a mobile device. The trusted recipient who wishes to read the reply must first have control of the mobile device, and must also have a key to decrypt the encrypted reply. Kefford, however, does not appear to allow the system to verify the trusted recipient.

U.S. pat. publ. no. 2009/0235339 to Mennes et al. (publ. September 2009) teaches a method of authenticating a trusted recipient by providing a recipient with a one-time security token through a trusted device that the trusted recipient must use in order to gain access to the system. However, Mennes fails to consider a situation where the trusted device itself has been stolen or otherwise compromised.

These systems can also be problematic where an unauthorized user steals and attempts to use a user's mobile device to send and receive replies from the system. In such circumstances, the systems fail to protect the user even though the responses are encrypted. In addition, the use of security tokens has myriad problems where an unauthorized user can simply steal the user's security to gain access to the system.

Therefore, there remains a need for improved systems and methods for verifying an identity of a trusted user prior to a transaction using a message authentication system.

SUMMARY OF THE INVENTION

The inventive subject matter provides apparatus, systems and methods in which a system authenticates a user by sending or receiving identifying codes or other information from a device, user interface, or other means of communication.

Preferred systems are configured to authenticate a user by sending a first passkey to a user interface of a known device having an associated device identifier. The passkey can be sent through a first secure communication pathway. Upon receipt, the user can send or otherwise submit the same passkey through a second communication pathway to the system from a second device with an associated device identifier that is preferably different from the device identifier associated with the other device. The system can then compare the first passkey against the received second passkey, and the first device identifier against the second device identifier, to thereby authenticate the user.

In another aspect of the inventive subject matter, it is contemplated that the system can authenticate a user based on the most recent request for a passkey rather than a previous request. After the system receives a subsequent request for a passkey, the system can send a second passkey to the user interface over a network. After the system receives a message from the user via the user's second device, the system then compares the passkey in the received message against the passkey sent to the user.

An exemplary embodiment of the invention can be found in TextPower's TextKey™ product, which was awarded the "Best Intrusion Detection/Prevention Solution" of 2011. This honor was voted on by a panel of government, military, and website security experts convened by Government Security News magazine. TextPower's TextKey™ product was also named the "Best Authentication Solution" in the Info Security Products Guide 2012 Global Excellence Awards competition.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based authentication system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
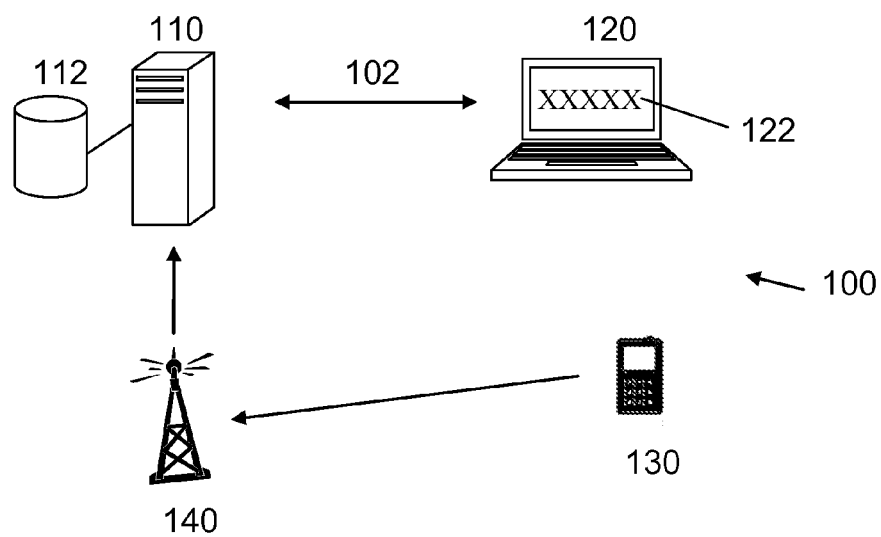
FIG. 1 is a schematic of an embodiment of a system for authenticating a user.

FIG. 1 illustrates an embodiment of a system 100 configured to authenticate a user. Generally, a computer system 110 first sends the user a passkey through a known secure channel 102, such as a secured website that can only be accessed through a website passkey. A user could access the secure channel 102 through a terminal or computer system 120, for example, which accesses computer system 110 having a user database 112. The terminal or computer system 120 could include a user interface. Preferably, the user gains access to the system 100 by some sort of authentication mechanism, such as a username/password authentication mechanism. User database 112 preferably has a list of users each of which is associated with one or more device identifiers that act as "keyholes" for the present system. In the embodiment shown in FIG. 1, the user database 112 comprises a device identifier for the first device, i.e., the terminal or computer system 120.

As used herein, a "passkey" is any object designated by a user which can be used to authenticate the user's identity, such as an alphanumeric word or phrase, an image selected or created by a user, a biometric signature (i.e. fingerprint, iris/retina scan, voiceprint, or chemical secretion), or a physical key. As used herein, a "communication pathway" is any method of communication, whether it be oral, tactile, electrical, or through other means. Preferably the passkey is configured to be transmitted through an electrical communication pathway, such as a wired or wireless network, so that the passkey could be easily manipulated by a computer system.

The computer system 110 can also be configured to communicate with a second device 130, which could be a mobile phone or other computing system. Where the second device 130 comprises a mobile phone, it is contemplated that the phone's unique phone number or numbers could be used as a device identifier associated with the second device 130. However, the second device 130 could be any device having a unique or semi-unique device identifier without departing from the scope of the invention. Contemplated devices include, for example, desktop or portable computers with unique network cards or serial numbers including laptops, tablet PCs, netbooks and so forth, mobile and smart telephones, key FOBs with UIDs associated with the device, and devices having a unique signature of a user, such as a social security number or email address.

The system 100 can be configured to authenticate the user at terminal 120 by sending a passkey 122 to the user through terminal 120. The user then enters the passkey 122 into a separate device 130 (e.g., mobile phone) and sends the passkey as a message to the system 110 through network access point 140. Preferably, the passkey is sent such that the system 110 can trace the message to ensure that the message came from a device having at least one of the device identifier(s) associated with the user. In an exemplary embodiment, the passkey is sent via a messaging service message, such as a SMS, SMIL, or an MMS protocol, which embeds the device identifier, typically the device's phone number, with the message. However, any commercially suitable protocol or service could be used to transmit the message to system 110.

After receiving the message from device 130, system 110 can then dissect the messaging service message to identify the sent passkey from the second device 130 as well as the sent device identifier associated with the second device 130. The system 110 could then compare the passkey sent from the device 130 against the initial passkey 122 sent to the terminal 120 or other computing device, and could also be configured to compare the device identifier sent from the device 130 against the device identifier associated with the user in the user database 112 to authenticate the user.

In this manner, the system 110 can authenticate a user accessing the system 110 via terminal 120 in a unique, novel way by forcing the user to send a passkey through a known, authenticated device 130 that preferably does not leave the user's person. Any counterfeit user who wishes to spoof another user's identity would not only need to know the other user's username/password, but would also need to steal the authenticated device from the user.

Figure 2A:
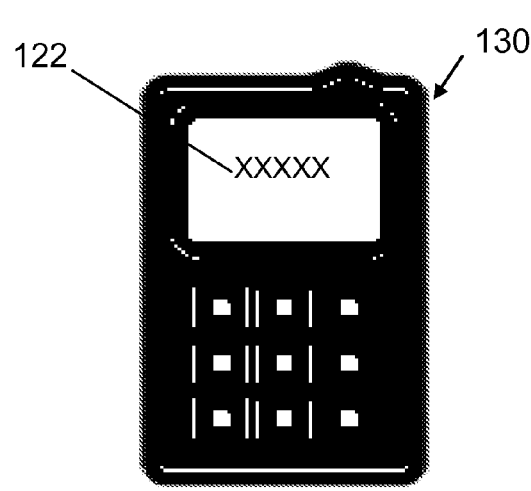
FIG. 2A is an embodiment of a passkey that a user has entered as a message on a device.
Figure 2B:
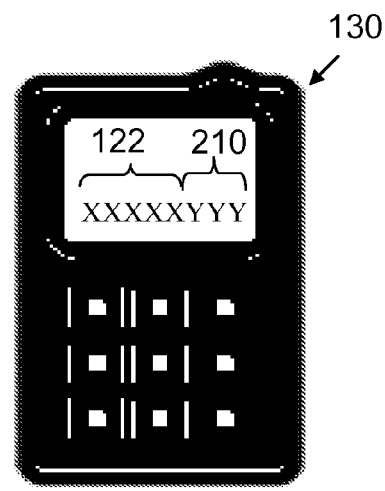
FIG. 2B is an embodiment of a passkey along with a signature that a user has entered as a message on a device.

In a simple embodiment, the passkey could be an alphanumeric phrase, such as a password that a user enters into a phone or other device such as by using a keyboard. However, the passkey could alternatively comprise an audio phrase that needs to be uttered by the user or could comprise a drawing. Other contemplated passkeys could comprise a biometric signature, a random-generated number based on a predefined set of algorithms, an answer to a question, and any other commercially suitable authentication schemes or combination(s) thereof. In a preferred embodiment, the user adds a separate signature passkey to the passkey 122 that is sent to the user via terminal 120. For example, as shown in FIG. 2A, the user sends passkey 122 as an SMS message, but in FIG. 2B, the user sends passkey 122 along with signature 210 as an SMS message, adding yet another level of authentication. In the case of an audio message or a drawing, a user could utter the audio message instead of copying or otherwise recording the audio message, which adds a voice signature to the message. Or a user could add a written signature to the messaging service message, which could then be compared to the user's known signature using various known methods.

The specific device identifier will likely depend on the user's device, and contemplated device identifiers including, for example, a telephone number, an internet protocol (IP) address, a MAC address, an email address, a device's serial number, a Unique Device Identifier (UDID) or other device signature, or other unique identifier.

Using the device identifier, the device of a user can be identified, defined, or otherwise assigned a device identifier from registration information submitted by the user or from any other commercially suitable means of identifying the device. For example, where the user uses the specific device during the registration process or otherwise communicates with system 110, it is contemplated that the device identifier can be automatically obtained from the user's device during the registration process. This device identifier can then be stored in the database 112 or other storage device.

In still other embodiments, the first passkey 122 (e.g. alphanumeric phrase, etc.) and the first device identifier (e.g. telephone number, email address, etc.) can be coupled or otherwise associated before the system 110 sends the first passkey 122 to the user interface 120. In yet other embodiments, the system 110 can send the first passkey 122 after the user enters a user name and password. It is contemplated that the system 110 can send the passkey through any suitable messaging services.

All intranet and internet network configurations are contemplated to perform the comparison of the passkeys and device identifiers including a remote server or service, a local server, a local server coupled to a database, a user interface implemented on a remote client connected to a local server, and others.

The service could be implemented as part of a company's security, such as a module that is installed on a local server, or the service could be implemented on a remote computer system (not shown) with which system 110 is configured to interface. In such an environment, the local server could send a command to the remote computer system to authenticate the user on terminal 120. The remote server could then send a passkey to the user, could receive the messaging service message after the user sends the passkey from the user's device and optionally extract a user-entered password from the message, could verify the user's device identifier and password, and then could send either (a) an authorization code to the local server, informing the local server that the user has been authenticated, or (b) an alarm to the local server, informing the local server that the user has not been authenticated.

All suitable telephony and telecommunications devices are contemplated including a cellular enabled device, a mobile telephone, a satellite phone, a mobile tablet device, a cloud computing station, a laptop, desktop, or others. All suitable messaging services are contemplated, including for example, SMS, SMIL, MMS, EMS, email services, instant messaging, and others.

All messages, notifications, and alerts are contemplated including sending an alert when the comparing step fails, sending private information through the user interface when the comparing step succeeds, sending an authorization code to a remote server when the comparing step succeeds, sending an authorization code in response to a ping, sending an alarm when the comparing step is performed after a threshold period of time, and others.

In an exemplary embodiment, the passkey 122 could expire after a certain threshold period of time, such that if a user sends the messaging service message after the threshold period of time, such as 2 minutes, 5 minutes, 10 minutes, or 30 minutes, then the user would remain non-authenticated. The passkey could also expire for other reasons, such as if the user inputs the wrong passkey, or if the user requests a second, replacement passkey.

System 110 can be further configured to avoid conflicting or multiple requests for passkeys. For example, the system 110 may receive a request for a third passkey before it receives the messaging service message with a passkey from the second device 130. Based on the request, the system 110 can send the third passkey and then compare this passkey against the passkey from the second device 130 to authenticate the user. After comparing these passkeys, the system 110 can send an authorization code to a remote server if the comparison is successful. The system 110 can also send an alert if the comparison of the old first passkey against the second passkey succeeds.

In another embodiment, the user can send encrypted information to the system 110 by entering the information into a web-based application that can be accessed from a computer terminal (e.g. 120), mobile device, mobile phone, tablet, or other computing system. The web-based application encrypts the message and provides a secure connection between the user's device and the system 110. The user can also select a recipient from their address book or the user can enter the recipient's phone number manually within the web-based application.

Once the system 110 receives the encrypted message, the system 110 can store the message on the server. The system can then produce a text message in plain, non-encrypted format and send this text message to the intended recipient who has a device, for example a mobile device 130. The text message can include a URL that the intended recipient can click or tap on from their mobile device to access a webpage on their mobile browser.

Upon reaching the web page, the intended recipient must enter a password to decrypt and read the message stored on the system server. It is contemplated that the password used to decrypt and access the stored message can be defined by the user upon registration, in order to verify ownership of the mobile phone used. It is further contemplated that the sender of the message can assign a password that can be used by a list of recipients. The recipients can know the password in advance or learn the password through other methods, for example, email, phone, and other forms of communication.

Once the recipient enters the password, the decrypted message is displayed on their mobile browser on their smart phone (e.g. 130), tablet, or other mobile device. The recipient can choose to delete the message, or the recipient can choose to store the message. The user can also define parameters wherein the system automatically deletes the encrypted message upon a pre-defined period of time, a set number of reads, security breach, or other trigger.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Thus, specific compositions and methods of authenticating a user have been disclosed. It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of using a service and an authenticating device to authenticate a user operating an initiating device, wherein the initiating device is different from the authenticating device, comprising the following steps of authenticating in sequence operated by the service:

the service accomplishing a first authentication with the initiating device, wherein the user enters separately a user identification and a first passkey and both of which the initiating device submits to the service;

the service, upon a successful first authentication, accomplishing a second authentication by sending a second passkey, which is different from the first passkey, to the initiating device, and receiving the second passkey from the authenticating device via a messaging service message; and the service accomplishing a third authentication by extracting and authenticating from the received service message a unique device identifier of the authenticating device to complete the user authentication.

2. The method of claim 1, further comprising using a telephone number to send the second passkey from the service to the initiating device.

3. The method of claim 1, further comprising using an email address to send the second passkey from the service to the initiating device.

4. The method of claim 1, wherein the second passkey comprises an alphanumeric phrase.

5. The method of claim 1, wherein the second passkey comprises an audio phrase.

6. The method of claim 1, wherein the second passkey comprises a user-created drawing.

7. The method of claim 1, further comprising extracting from the message a third passkey, and comparing the second passkey against the third passkey.

8. The method of claim 7, further comprising sending an alert when the step of comparing fails.

9. The method of claim 7, further comprising sending an authorization code to a remote server when the step of comparing succeeds.

10. The method of claim 9, wherein the authorization code is sent in response to a ping.

11. The method of claim 7, further comprising sending an alarm when the step of comparing is performed after a threshold period of time.

12. The method of claim 1, wherein the service is distal to both the initiating device and the authenticating device.

13. The method of claim 1, wherein the authenticating device comprises a telephony enabled device.

14. The method of claim 1, wherein the authenticating device comprises a cellular enabled device.

15. The method of claim 1, wherein the authenticating device comprises a mobile telephone.

16. The method of claim 1, wherein the messaging service message is an SMS message.

17. The method of claim 1, wherein the messaging service message is an SMIL message.

18. The method of claim 1, wherein the messaging service message is an MMS message.

19. The method of claim 1, further comprising:
sending a third passkey to the initiating device; and
comparing the third passkey against the authentication reply.

20. The method of claim 19, further comprising sending an authorization code to a remote server when the step of comparing the third passkey against the authentication reply succeeds.

21. The method of claim 19, further comprising sending an alarm when the step of comparing the third passkey against the authentication reply succeeds.

22. The method of claim 1, wherein the device identifier of the authenticating device comprises an internet protocol (IP) address.

23. The method of claim 1, wherein the device identifier of the authenticating device comprises a MAC address.

24. The method of claim 1, wherein the device identifier of the authenticating device comprises a serial number.

25. The method of claim 1, wherein the device identifier of the authenticating device comprises a Unique Device Identifier (UDID).

26. The method of claim 1, wherein the service device selects the authentication device using a database that correlates user with authentication devices.

* * * * *